(12) United States Patent
Lai et al.

(10) Patent No.: US 12,348,705 B2
(45) Date of Patent: Jul. 1, 2025

(54) IMAGE DISPLAY SYSTEM AND DISPLAY METHOD

(71) Applicant: Coretronic Corporation, Hsin-Chu (TW)

(72) Inventors: Wei-Chia Lai, Hsin-Chu (TW); Te-Sung Su, Hsin-Chu (TW); Yen-Yu Chou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 104 days.

(21) Appl. No.: 18/171,654

(22) Filed: Feb. 20, 2023

(65) Prior Publication Data

US 2023/0283764 A1    Sep. 7, 2023

(30) Foreign Application Priority Data

Mar. 4, 2022   (CN) .......................... 202210209812.1

(51) Int. Cl.
H04N 13/398    (2018.01)
H04N 13/106    (2018.01)
H04N 13/344    (2018.01)

(52) U.S. Cl.
CPC ......... *H04N 13/398* (2018.05); *H04N 13/158* (2018.05); *H04N 13/344* (2018.05)

(58) Field of Classification Search
CPC ... H04N 13/398; H04N 13/158; H04N 13/344
See application file for complete search history.

(56) References Cited

U.S. PATENT DOCUMENTS

| | | | |
|---|---|---|---|
| 6,573,819 B1 * | 6/2003 | Oshima ................. | G11B 27/10 348/E13.058 |
| 10,802,594 B2 * | 10/2020 | Lee ........................ | G06V 40/28 |

(Continued)

FOREIGN PATENT DOCUMENTS

| CN | 104112441 | 10/2014 |
|---|---|---|
| CN | 104112441 A * | 10/2014 |

(Continued)

OTHER PUBLICATIONS

"Low Crosstalk Multi-View Tracking 3-D Display of Synchro-Signal LED Scanning Backlight System"—Jian-Chiun Liou, Kuan Lee, and Juy-Fong Huang; Journal of Display Technology, vol. 7, No. 8, Aug. 2011 (Year: 2011).*

*Primary Examiner* — Mainul Hasan
(74) *Attorney, Agent, or Firm* — JCIPRNET

(57) ABSTRACT

An image display system and a display method are provided. The image display system includes at least one image display device including an image decoding circuit, a 3D image processing circuit, and an image playback circuit. The image decoding circuit decodes a 3D image signal from an external signal source to obtain and output an image data signal and a synchronization signal. The 3D image processing circuit performs 3D image processing on the image data signal and the synchronization signal to generate a processed image data signal and a processed synchronization signal. The viewing angle switching circuit generates a processed viewing angle switching signal according to the processed synchronization signal. The image playback circuit generates a playback image signal according to the processed image data signal. The image display system generates a 3D image according to the processed viewing angle switching signal and the playback image signal.

10 Claims, 8 Drawing Sheets

(56) References Cited

U.S. PATENT DOCUMENTS

| | | | |
|---|---|---|---|
| 2002/0001045 A1* | 1/2002 | Ranganath | H04N 19/597 |
| | | | 348/E13.043 |
| 2011/0187837 A1* | 8/2011 | Price | H04N 13/30 |
| | | | 348/500 |
| 2011/0187838 A1* | 8/2011 | Price | H04N 13/172 |
| | | | 348/56 |
| 2011/0228061 A1* | 9/2011 | Price | H04N 13/398 |
| | | | 348/56 |
| 2011/0285832 A1* | 11/2011 | Yoon | G09G 3/003 |
| | | | 348/E13.059 |
| 2013/0286166 A1* | 10/2013 | Lee | H04N 21/42222 |
| | | | 348/51 |
| 2019/0052866 A1* | 2/2019 | Chang | G06F 3/013 |
| 2021/0006768 A1* | 1/2021 | Peng | G09G 5/006 |

FOREIGN PATENT DOCUMENTS

| | | | | |
|---|---|---|---|---|
| CN | 209881957 | | 12/2019 | |
| CN | 209881957 U | * | 12/2019 | G09G 3/20 |
| WO | WO-2018121012 A1 | * | 7/2018 | G06F 3/1446 |

* cited by examiner ial no. 202210209812.1, filed on Mar. 4, 2022. The entirety of the above-mentioned patent application is hereby incorporated by reference herein and made a part of this specification

IMAGE DISPLAY SYSTEM AND DISPLAY METHOD

CROSS-REFERENCE TO RELATED APPLICATION

This application claims the priority benefit of China application serial no. 202210209812.1, filed on Mar. 4, 2022. The entirety of the above-mentioned patent application is hereby incorporated by reference herein and made a part of this specification

BACKGROUND

Technical Field

The invention relates to an image display system and a display method.

Description of Related Art

Compared with planar images, three-dimensional (3D) images may provide richer content and visual presentation. In order to present a 3D effect, signals for generating the 3D images not only include a synchronization signal corresponding to a frame number but also a viewing angle switching signal corresponding to the left and right eyes of 3D glasses.

Some external signal sources may provide the corresponding viewing angle switching signal while providing an image signal. However, when external signal sources cannot provide the viewing angle switching signal corresponding to the image signal, the presentation of the 3D images may fail.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an image display system and a display method, which are adapted to smoothly display a 3D image when an external signal source cannot provide a viewing angle switching signal.

According to an embodiment of the invention, the image display system is configured to display a 3D image. The image display system includes at least one image display device. The image display device includes an image decoding circuit, a 3D image processing circuit, and an image playback circuit. The image decoding circuit is configured to decode a 3D image signal from an external signal source, so as to obtain and output an image data signal and a synchronization signal. The 3D image processing circuit receives the image data signal and the synchronization signal from the image decoding circuit. The 3D image processing circuit is configured to perform 3D image processing on the image data signal and the synchronization signal, so as to generate and output a processed image data signal and a processed synchronization signal. The 3D image processing circuit further includes a viewing angle switching circuit. The viewing angle switching circuit is configured to generate and output a processed viewing angle switching signal according to the processed synchronization signal. The image playback circuit is configured to receive the processed image data signal. The image playback circuit generates and outputs a playback image signal according to the processed image data signal. The image display system generates a 3D image according to the processed viewing angle switching signal and the playback image signal.

In a related embodiment, the processed viewing angle switching signal is synchronized with the processed synchronization signal.

In a related embodiment, the at least one image display device further includes a delay correction circuit. The delay correction circuit is coupled to the viewing angle switching circuit, and the delay correction circuit is configured to adjust a phase or a level of the processed viewing angle switching signal, and output the corrected processed viewing angle switching signal, where the corrected processed viewing angle switching signal is synchronized with the playback image signal.

In a related embodiment, the at least one image display device further includes a viewing angle input circuit and a delay correction circuit. The viewing angle input circuit is configured to receive a viewing angle switching signal from the external signal source, where the viewing angle switching signal corresponds to the 3D image signal. The delay correction circuit is coupled to the viewing angle input circuit and an input terminal and an output terminal of the 3D image processing circuit, and the delay correction circuit is configured to adjust a phase or a level of the viewing angle switching signal according to a delay time between the synchronization signal and the processed synchronization signal, so as to generate the processed viewing angle switching signal, where the processed viewing angle switching signal is synchronized with the processed synchronization signal.

In a related embodiment, the at least one image display device further includes a signal conversion circuit. The signal conversion circuit is coupled to the 3D image processing circuit and the viewing angle input circuit, and the signal conversion circuit is configured to select and receive one of the processed viewing angle switching signal from the 3D image processing circuit and the viewing angle switching signal from the viewing angle input circuit.

In a related embodiment, the image decoding circuit and the 3D image processing circuit are implemented by a field programmable gate array.

In a related embodiment, the image display system further includes a 3D wearable device. The 3D wearable device is configured to receive the processed viewing angle switching signal, and receive the playback image signal output by the image playback circuit according to the processed viewing angle switching signal, so as to display the 3D image.

In a related embodiment, the image display system includes a first image display device and a second image display device, where the first image display device and the second image display device respectively receive the 3D image signal from the external signal source, and respectively output the playback image signal at a same timing.

In a related embodiment, the image display system further includes a 3D wearable device. The 3D wearable device is electrically connected to one of the first image display device and the second image display device, and the 3D wearable device is configured to receive the processed viewing angle switching signal from the one of the first image display device and the second image display device, and the 3D wearable device is operated according to the processed viewing angle switching signal when the image display system displays the 3D image.

An embodiment of the invention provides a display method adapted to display a 3D image through an image display system. The image display system includes at least one image display device. The display method includes following steps. A 3D image signal is received from an external signal source through an image decoding circuit of at least one image display device. The 3D image signal is decoded to obtain an image data signal and a synchronization signal. 3D image processing is performed on the image data signal and the synchronization signal through a 3D image processing circuit of the at least one image display device, so as to generate and output a processed image data signal and a processed synchronization signal. A processed viewing angle switching signal is generated and output through a viewing angle switching circuit of the at least one image display device according to the processed synchronization signal. A playback image signal is generated and outputted through an image playback circuit of the at least one image display device according to the processed image data signal. A 3D image is generated through the image display system according to the processed viewing angle switching signal and the playback image signal.

In a related embodiment, after the processed viewing angle switching signal is output through the viewing angle switching circuit, the display method further includes a following step. A phase or a level of the processed viewing angle switching signal is adjusted through a delay correction circuit of the at least one image display device, where a corrected processed viewing angle switching signal is synchronized to the playback image signal.

In a related embodiment, the display method further includes following steps. A viewing angle switching signal is received from the external signal source through a viewing angle input circuit of the at least one image display device, where the viewing angle switching signal corresponds to the 3D image signal. A phase or a level of the viewing angle switching signal is adjusted through the delay correction circuit according to a delay time between the synchronization signal and the processed synchronization signal, so as to generate the processed viewing angle switching signal.

In a related embodiment, the image display system includes a 3D wearable device, a first image display device, and a second image display device. The first image display device and the second image display device respectively receive the 3D image signal from the external signal source, and respectively output the playback image signal at a same timing. The display method further includes followings steps. The processed viewing angle switching signal is output to the 3D wearable device through one of the first image display device and the second image display device. The 3D wearable device is operated according to the processed viewing angle switching signal when the image display system displays the 3D image.

Based on the above description, with the image display system and the display method of the invention, the processed viewing angle switching signal is generated and output through the viewing angle switching circuit according to the processed synchronization signal. The image display system may generate a 3D image according to the processed viewing angle switching signal and the playback image signal. In this way, even when the external signal source cannot provide the viewing angle switching signal corresponding to the 3D image signal, the image display system and the display method may still display the 3D image smoothly. Moreover, with the image display system and the display method of the invention, a time delay between the playback image signal and the processed viewing angle switching signal may be effectively reduced relative to an original image data signal and the synchronization signal, so as to achieve the effect of good display quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
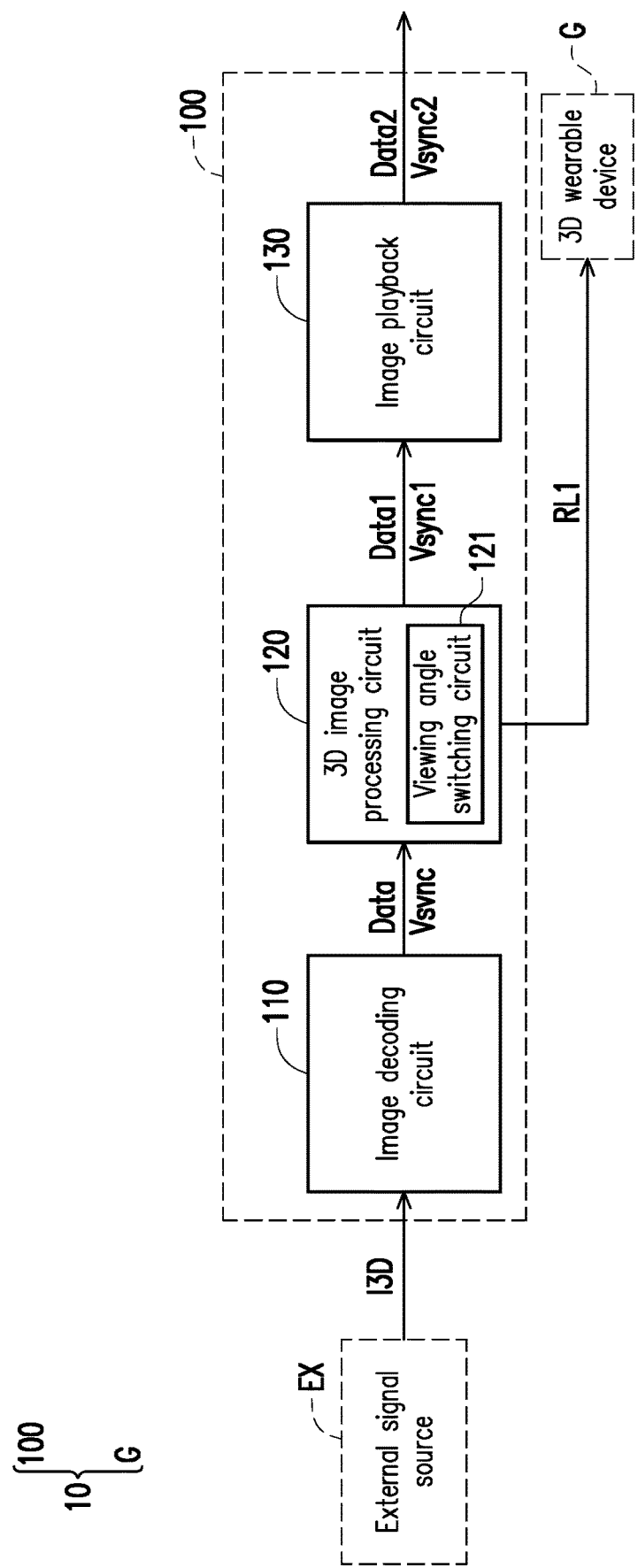
FIG. 1 is a schematic diagram of an image display system according to an embodiment of the invention.

FIG. 1 is a schematic diagram of an image display system according to an embodiment of the invention. Referring to FIG. 1, an image display system 10 may be used to display 3D images. Moreover, the image display system 10 may include at least one image display device 100. The image display device 100 may include an image decoding circuit 110, a 3D image processing circuit 120 and an image playback circuit 130. The image display system 10 may be, for example, a 3D projector, a 3D TV or other 3D image player.

The image display device 100 is configured to receive a 3D image signal I3D from an external signal source EX. The image decoding circuit 110 may decode the 3D image signal I3D from the external signal source EX to obtain and output an image data signal Data and a synchronization signal Vsync. In one embodiment, the external signal source EX may be, for example, a mobile phone, a tablet computer, a notebook computer, a desktop computer, or other devices capable of outputting signals, which is not limited by the invention. In an embodiment, the image decoding circuit 110 may receive the signals of the external signal source EX through, for example, a video graphics array (VGA) interface, a digital visual interface (DVI), a high-definition multimedia interface (HDMI), a displayport (DP) interface or other wired or wireless transmission interfaces that may receive image data, which is not limited by the invention.

The 3D image processing circuit 120 may receive the image data signal Data and the synchronization signal Vsync from the image decoding circuit 110. The 3D image processing circuit 120 may perform 3D image processing on the image data signal Data and the synchronization signal Vsync to generate and output a processed image data signal Data1 and a processed synchronization signal Vsync1. In an embodiment, the 3D image processing circuit 120 may provide image processing functions such as image dimension scaling, motion estimation & motion compensation (MEMC), keystone correction, image blending or image warping adjustment, etc., to adjust a display state of a 3D image, but the invention does not specifically limit the type of image processing functions.

The image playback circuit 130 may be used to receive the processed image data signal Data1 and the processed synchronization signal Vsync1. The image playback circuit 130 may generate and output a playback image signal Data2 and a playback synchronization signal Vsync2 according to the processed image data signal Data1 and the processed synchronization signal Vsync1.

It should be noted that the 3D image processing circuit 120 may further include a viewing angle switching circuit 121. The viewing angle switching circuit 121 may be used to generate and output a processed viewing angle switching signal RL1 according to the processed synchronization signal Vsync1. The image display system 10 may generate a 3D image according to the processed viewing angle switching signal RL1 and the playback image signal Data2.

In an embodiment, the image display system 10 further includes a 3D wearable device G. The 3D wearing device G is, for example, a pair of 3D glasses for presenting a 3D image to a user wearing the 3D glasses. The 3D wearable device G has a left lens and a right lens corresponding to a left eye and a right eye of the user. The 3D wearable device G may be electrically connected to the 3D image processing circuit 120 of the image display device 100, and the 3D wearable device G may receive the processed viewing angle switching signal RL1 from the image display device 100, and is correspondingly operated to allow the left eye and the right eye of the user to see a 3D image.

In an embodiment, the image display system 10 further includes a 3D emitter (not shown in the figure). The 3D emitter is electrically connected to the 3D image processing circuit 120 of the image display device 100. More specifically, the 3D emitter is disposed on a signal transmission path between the 3D image processing circuit 120 and the 3D wearable device G. The image display device 100 may provide the processed viewing angle switching signal RL1 to the 3D emitter in a wired or wireless manner. In addition, the 3D emitter may provide the processed viewing angle switching signal RL1 to the 3D wearable device G of the user in a wireless manner. To be specific, the processed viewing angle switching signal RL1 includes a switching time signal of the left and right lenses of the 3D wearable device G, and the 3D emitter is used to control a switching time of the left and right lenses of the 3D wearing device G. When the image display system 10 generate the 3D image according to the processed viewing angle switching signal RL1 and the playback image signal Data2, the 3D wearable device G may be correspondingly operated to control the switching of the left lens and the right lens, so as to allow a left eye and a right eye of the user to see the images alternatively. After the user sees the images, the images seen by the two eyes are combined in the brain to achieve the effect of a 3D image. The 3D emitter may be, for example, an infrared emitter. The 3D emitter may include, for example, an infrared light source, a receiver, etc.

In an embodiment, the image decoding circuit 110 and the 3D image processing circuit 120 may be implemented by a field programmable gate array (FPGA), and the image playback circuit 130 may be implemented by a data display processor (DDP), which is not limited by the invention.

In an embodiment, the image decoding circuit 110, the 3D image processing circuit 120 and the image playback circuit 130 may be, for example, a central processing unit (CPU), a microprocessor, and a digital signal processor (DSP), a programmable controller, a programmable logic device (PLD) or other similar devices or a combination of these devices, which is not limited by the invention. Moreover, in an embodiment, various functions of the image decoding circuit 110, the 3D image processing circuit 120, and the image playback circuit 130 may be implemented as a plurality of program codes. These program codes may be stored in a memory, and may be executed by the image decoding circuit 110, the 3D image processing circuit 120 and the image playback circuit 130. Alternatively, in an embodiment, the various functions of the image decoding circuit 110, the 3D image processing circuit 120, and the image playback circuit 130 may be implemented as one or a plurality of circuits. Moreover, the functions of the image decoding circuit 110, the 3D image processing circuit 120 and the image playback circuit 130 may be implemented by a plurality of independent components or implemented by an integrated component. The invention does not limit the use of software or hardware to implement the functions of the image decoding circuit 110, the 3D image processing circuit 120 and the image playback circuit 130.

Figure 2:
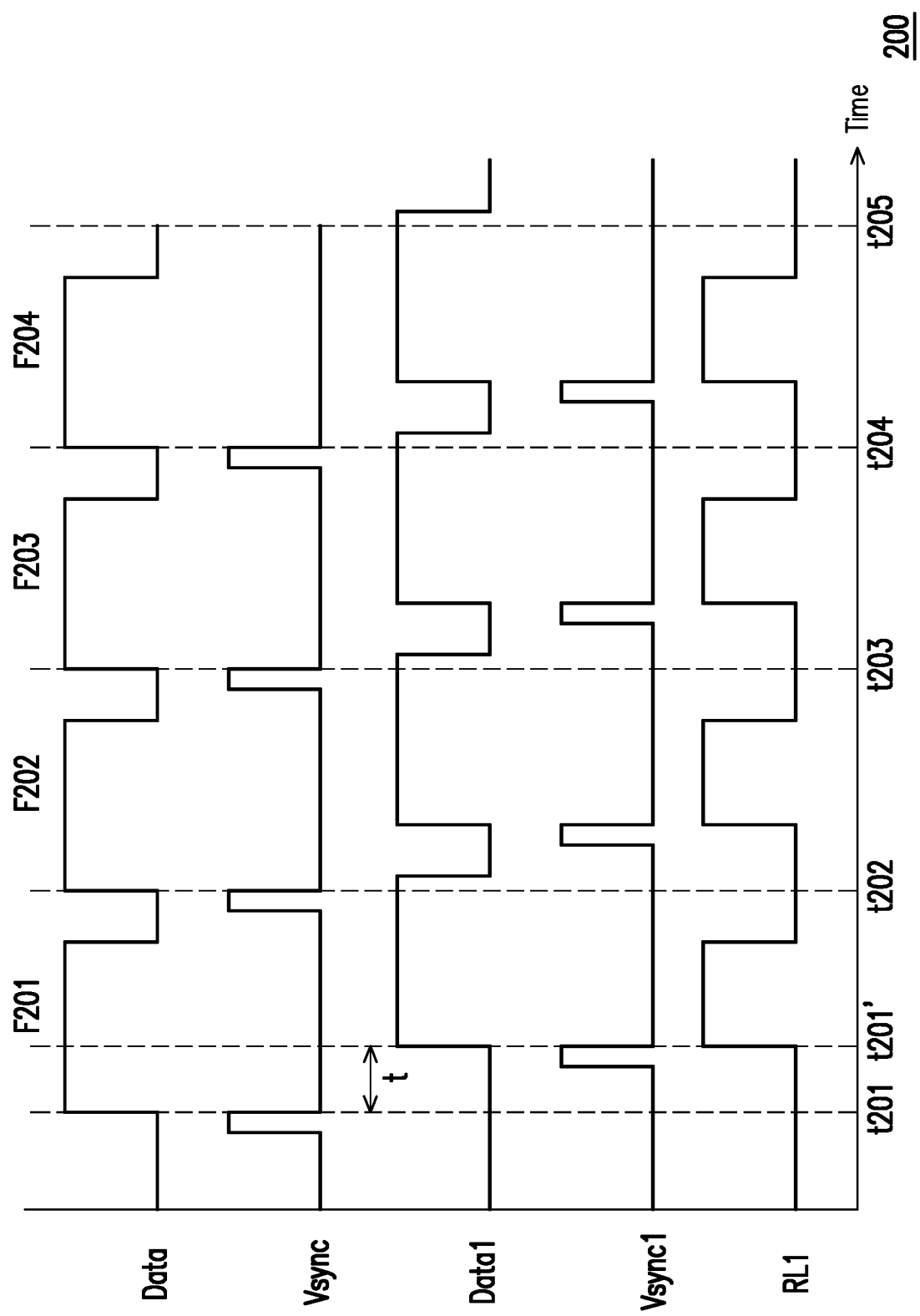
FIG. 2 is a clock signal diagram of an image display device according to an embodiment of the invention.

FIG. 2 is a clock signal diagram of an image display device according to an embodiment of the invention. Referring to FIG. 1 and FIG. 2, a clock signal diagram 200 may include a frame F201, a frame F202, a frame F203 and a frame F204, which are respectively set between each adjacent two of time t201 to time t205.

At the time t201, the image data signal Data decoded by the image decoding circuit 110 starts to store image data, and a falling edge (Falling Edge) of the synchronization signal Vsync is aligned with a rising edge (Rising Edge) of the image data signal Data.

After the image data signal Data and the synchronization signal Vsync are processed by the 3D image processing circuit 120, compared with the original image data signal Data and the synchronization signal Vsync, the processed image data signal Data1 and the processed synchronization signal Vsync1 may probably have a certain delay time tin timing. For example, at time t201', a falling edge of the processed synchronization signal Vsync1 is aligned with a rising edge of the processed image data signal Data1. The time t201' differs from the time t201 by the delay time t.

Namely, a time point at which the processed image data signal Data1 starts to store image data may no longer be the time t201, but the time t201'. If the viewing angle switching signals corresponding to the left and right eyes are still synchronized with the original image data signal Data and the synchronization signal Vsync, the 3D image displayed by the image display system 10 may not be displayed smoothly.

In the embodiment, the viewing angle switching circuit 121 of the 3D image processing circuit 120 may be configured to generate and output the processed viewing angle switching signal RL1 according to the processed synchronization signal Vsync1. For example, the viewing angle switching circuit 121 may set a phase or a level (i.e., a position and magnitude of a rising edge) of the original viewing angle switching signal according to a falling edge of the processed synchronization signal Vsync1 to generate the processed viewing angle switching signal RL1. Moreover, the processed viewing angle switching signal RL1 may be synchronized with the processed synchronization signal Vsync1. In other words, a rising edge of the processed view switching signal RL1 may be aligned with the falling edge of the processed synchronization signal Vsync1.

In an embodiment, the viewing angle switching circuit 121 is coupled to an input terminal and an output terminal of the 3D image processing circuit 120. The viewing angle switching circuit 121 may set the phase or level of the viewing angle switching signal according to the delay time t between the synchronization signal Vsync and the processed synchronization signal Vsync1 or between the image data signal Data and the processed image data signal Data1, so as to generate the processed viewing angle switching signal RL1.

In the embodiment, the 3D image processing is performed through the 3D image processing circuit 120, and the image playback circuit 130 only needs to convert the processed image data signal Data1 and the processed synchronization signal Vsync1 into the playback image signal Data2 and the playback synchronization signal Vsync2. Since the image processing performed by the image playback circuit 130 is relatively simple and uncomplicated, the delay caused by the image playback circuit 130 to the processed image data signal Data1 may be greatly reduced. The playback image signal Data2 (shown in FIG. 1) generated after processing of the image playback circuit 130 may not have any delay compared with the processed image data signal Data1. In other words, the playback image signal Data2 and the playback synchronization signal Vsync2 are still synchronized with the processed image data signal Data1 and the processed synchronization signal Vsync1.

In this way, even when the external signal source EX cannot provide the viewing angle switching signal corresponding to the 3D image signal I3D to the image display system 10, the user of the 3D wearable device G of the image display system 10 may still see the 3D image smoothly. In addition, the image display system 10 of the invention may also effectively reduce the time delay between the playback image signal Data2 and the processed viewing angle switching signal RL1 relative to the original image data signal Data and the synchronization signal Vsync, so as to achieve a good display quality effect.

Figure 3:
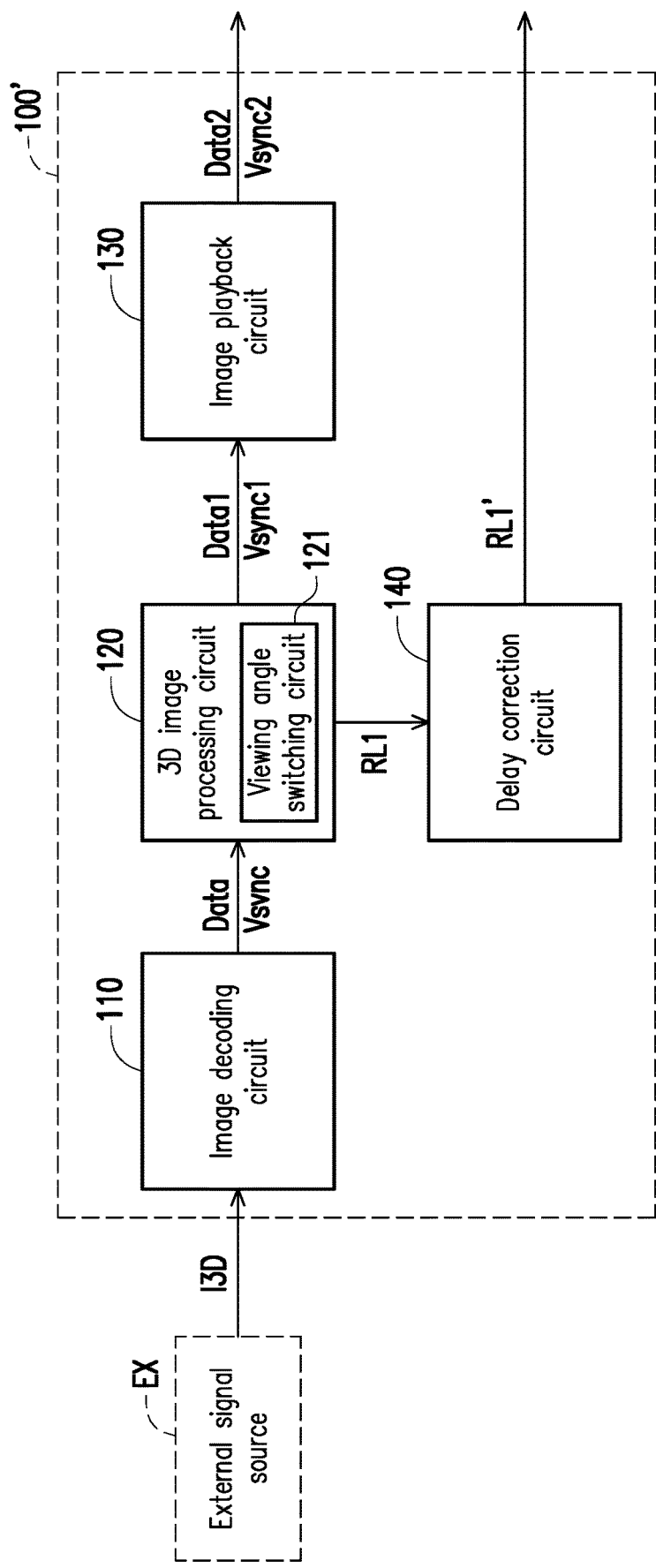
FIG. 3 is a schematic diagram of an image display device according to an embodiment of the invention.
Figure 4:
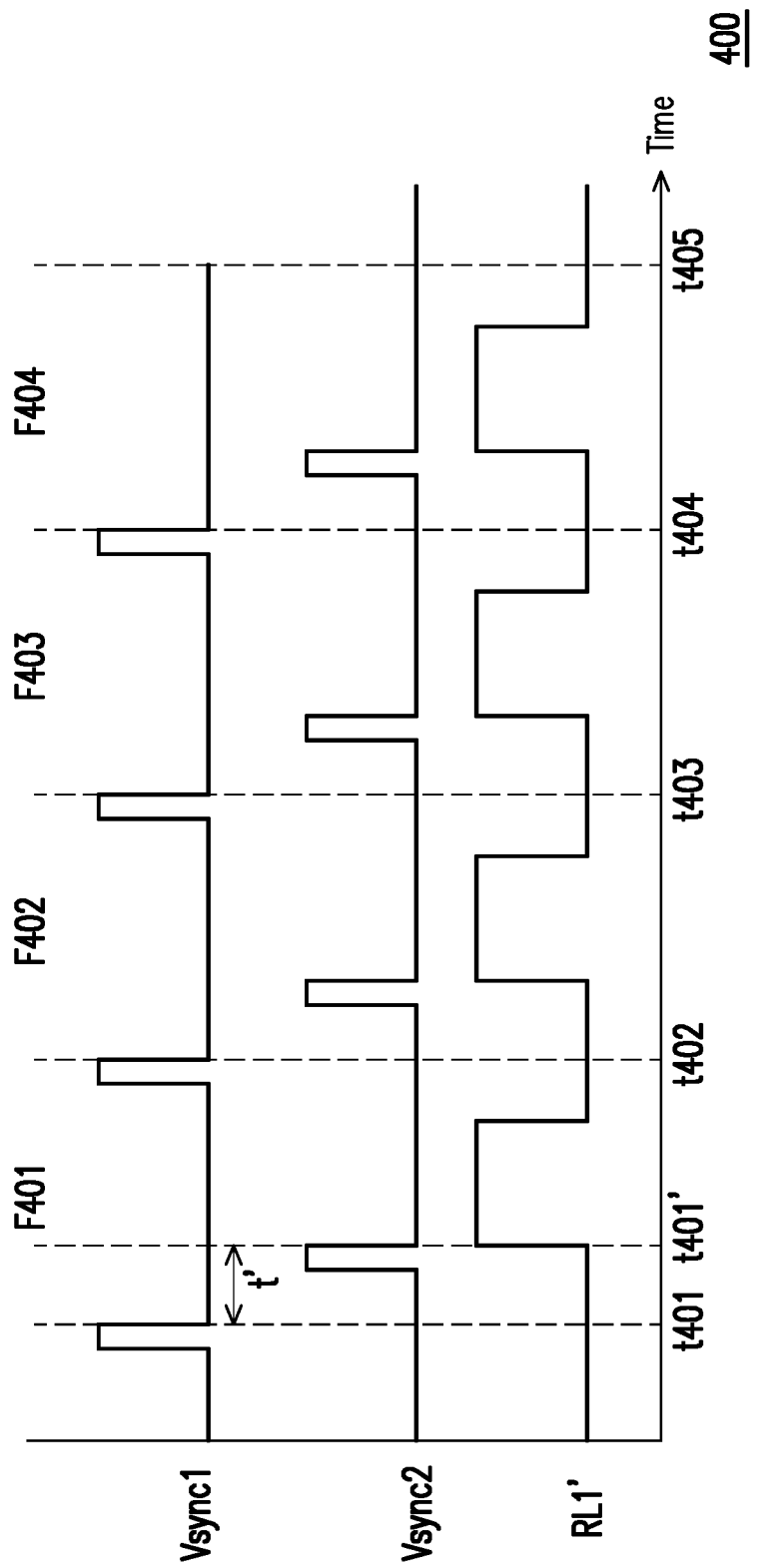
FIG. 4 is a clock signal diagram of an image display device according to an embodiment of the invention.

FIG. 3 is a schematic diagram of an image display device according to an embodiment of the invention. FIG. 4 is a clock signal diagram of an image display device according to an embodiment of the invention. Referring to FIG. 1, FIG. 3 and FIG. 4, compared with FIG. 1, an image display device 100' of FIG. 3 further includes a delay correction circuit 140. The image display device 100 of the image display system 10 in FIG. 1 may be replaced with the image display device 100' in FIG. 3. Other details of the image display device 100' in FIG. 3 may be obtained by referring to the description in FIG. 1, which are not repeated. A clock signal diagram 400 of FIG. 4 may include a frame F401, a frame F402, a frame F403 and a frame F404, which are respectively set between each adjacent two of time t401 and time t405.

In the embodiment, as shown in FIG. 4, a falling edge of the processed synchronization signal Vsync1 generated by the viewing angle switching circuit 121 is aligned with time t401. The playback image signal Data2 and the playback synchronization signal Vsync2 generated by the image playback circuit 130 may be delayed. Namely, compared with the processed image signal Data1 and the processed synchronization signal Vsync1, the playback image signal Data2 and the playback synchronization signal Vsync2 may have a certain delay time t' in timing.

The delay correction circuit 140 may be coupled to the viewing angle switching circuit 121. The delay correction circuit 140 may be used to adjust a phase or a level of the processed viewing angle switching signal RL1, and output a corrected processed viewing angle switching signal RL1'. For example, the delay correction circuit 140 may set the phase or level (i.e., a position and magnitude of a rising edge) of the processed viewing angle switching signal RL1 according to a falling edge of the playback synchronization signal Vsync2 to generate the corrected processed viewing angle switching signal RL1'. In addition, the corrected processed viewing angle switching signal RL1' may be synchronized with the playback image signal Data2. For example, at time t401', a rising edge of the corrected processed viewing angle switching signal RL1' may be aligned with the falling edge of the playback synchronization signal Vsync2. The time t401' differs from the time t401 by a delay time t'.

In an embodiment, the delay correction circuit 140 may set the phase or level of the processed viewing angle switching signal RL1 according to the delay time t' between the processed synchronization signal Vsync1 and the playback synchronization signal Vsync2 or between the processed image data signal Data1 and the playback image signal Data2 to generate the corrected processed viewing angle switching signal RL1'.

In this way, a frame delay generated when the image playback circuit 130 processes the processed image signal Data1 may be corrected, and the image display system 10 may smoothly display a 3D image. In addition, the image display system 10 of the invention may also effectively reduce a time delay between the playback image signal Data2 and the processed viewing angle switching signal RL1 relative to the original image data signal Data and the synchronization signal Vsync or may reduce a time delay between the playback image signal Data2 and the corrected processed viewing angle switching signal RL1' relative to the original image data signal Data and the synchronization signal Vsync, so as to a achieve good display quality effect.

Figure 5:
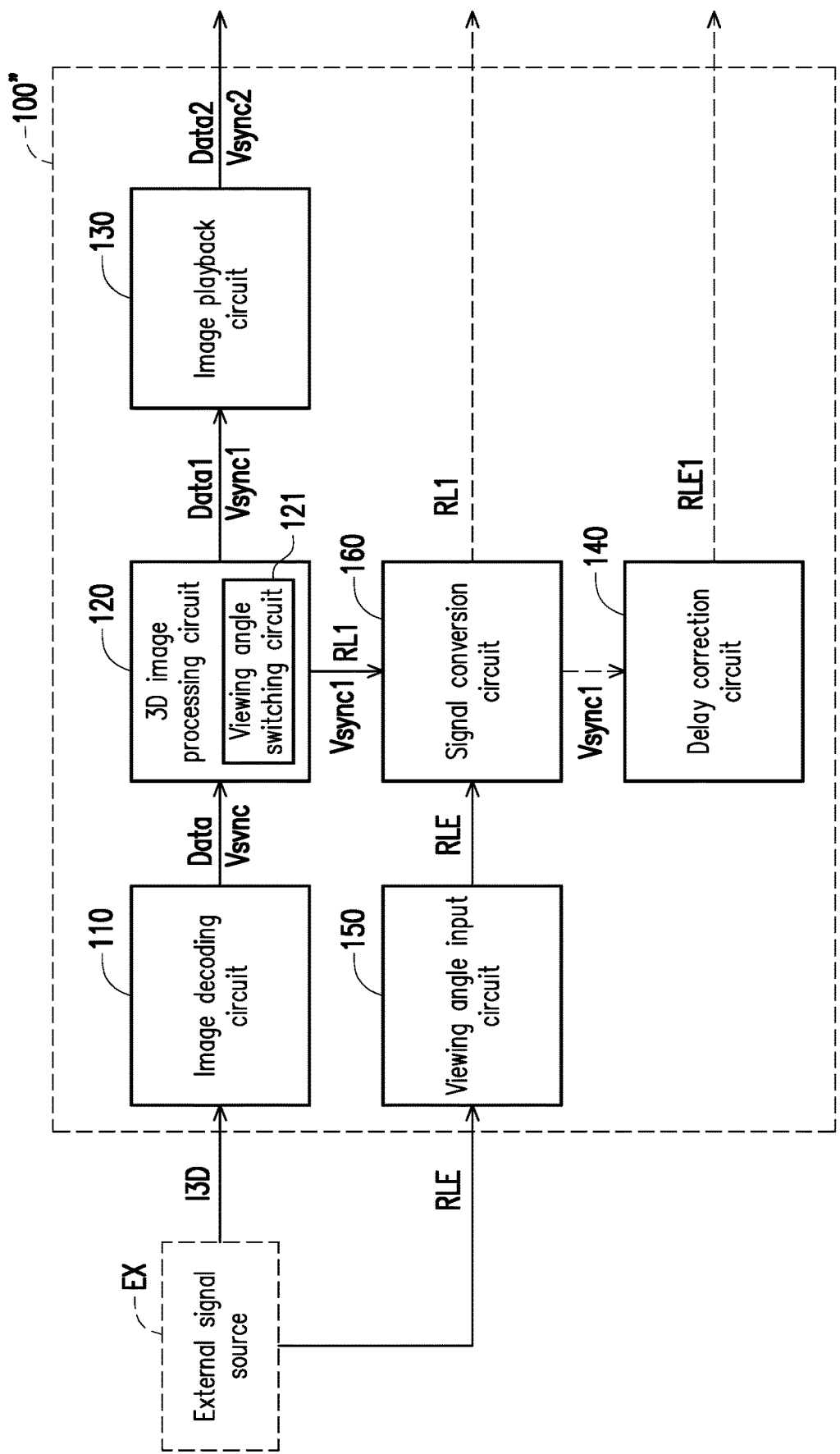
FIG. 5 is a schematic diagram of an image display device according to an embodiment of the invention.

FIG. 5 is a schematic diagram of an image display device according to an embodiment of the invention. Referring to FIG. 3 and FIG. 5, compared with FIG. 3, an image display device 100" of FIG. 5 further includes a viewing angle input circuit 150 and a signal conversion circuit 160. The image display device 100 of the image display system 10 of FIG. 1 may be replaced with the image display device 100" in FIG. 5, and other details of the image display device 100" in FIG. 5 may be obtained by referring to related descriptions of FIG. 1 and FIG. 3, which are not repeated.

It should be noted that dashed line arrows in FIG. 5 represent selective signal paths. The paths of the dashed line arrows located above and to the right of the delay correction circuit 140 will be described below.

In an embodiment, in addition to providing the 3D image signal I3D to the image display device 100", the external signal source EX further provides a viewing angle switching signal RLE. The 3D image processing circuit 120 of the image display device 100" may receive the image data signal Data and the synchronization signal Vsync from the image decoding circuit 110. The viewing angle input circuit 150 of the image display device 100" may be used to receive the viewing angle switching signal RLE from the external signal source EX. The viewing angle switching signal RLE may correspond to the 3D image signal I3D.

The 3D image processing circuit 120 may be used to perform 3D image processing on the image data signal Data and the synchronization signal Vsync to generate and output the processed image data signal Data1 and the processed synchronization signal Vsync1.

The delay correction circuit 140 may be coupled to the viewing angle input circuit 150 and the input terminal and the output terminal of the 3D image processing circuit 120. In an embodiment, the delay correction circuit 140 may be coupled to the viewing angle input circuit 150 and the 3D image processing circuit 120 through the signal conversion circuit 160. In another embodiment, the delay correction circuit 140 may be directly coupled to the viewing angle input circuit 150 and the 3D image processing circuit 120.

Figure 6:
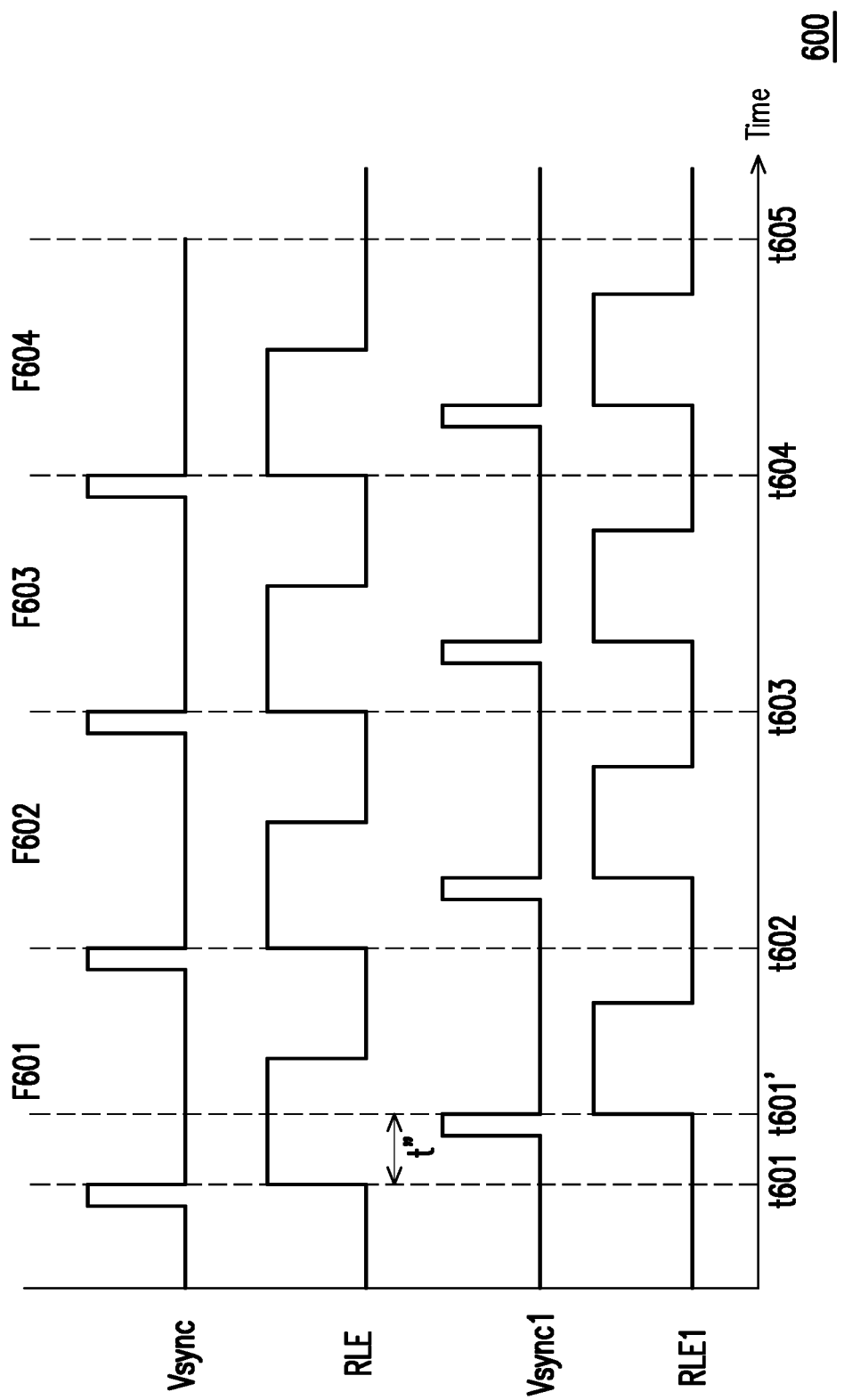
FIG. 6 is a clock signal diagram of an image display device according to an embodiment of the invention.

FIG. 6 is a clock signal diagram of an image display device according to an embodiment of the invention. Referring to FIG. 1, FIG. 5 and FIG. 6, a clock signal diagram 600 may include a frame F601, a frame F602, a frame F603 and a frame F604, which are respectively set between each adjacent two of time t601 to time t605.

At the time t601, a falling edge of the synchronization signal Vsync obtained by the image decoding circuit 110 is aligned with the rising edge of the viewing angle switching signal RLE received by the viewing angle input circuit 150. The processed synchronization signal Vsync1 generated by the 3D image processing circuit 120 may be delayed from the synchronization signal Vsync. Namely, compared with the synchronization signal Vsync and the viewing angle switching signal RLE, the processed synchronization signal Vsync1 and the processed viewing angle switching signal RLE1 may have a certain delay time t" in timing.

In the embodiment, the delay correction circuit 140 may be used to set a phase or a level (i.e., a position and magnitude of a rising edge) of the viewing angle switching signal RLE according to a falling edge of the processed synchronization signal Vsync1 to generate and output the processed viewing angle switching signal RLE1. Moreover, the processed viewing angle switching signal RLE1 may be synchronized with the processed sync signal Vsync1. In other words, the rising edge of the processed viewing angle switching signal RLE1 may be aligned with the falling edge of the processed synchronization signal Vsync1.

In an embodiment, the delay correction circuit 140 may set the phase or level of the viewing angle switching signal RLE according to the delay time t" between the synchronization signal Vsync and the processed synchronization signal Vsync1 or between the image data signal Data and the processed image data signal Data1, so as to generate the processed viewing angle switching signal RLE1.

In this way, the frame delay generated when the 3D image processing circuit 120 processes the image data signal Data may be corrected, and the image display system 10 may smoothly display the 3D image.

It should be noted that the delay correction circuit 140 of FIG. 5 may be used to correct the frame delay generated when the 3D image processing circuit 120 processes the image data signal Data. In another embodiment, the delay correction circuit 140 may also be used to correct the frame delay generated when the image playback circuit 130 processes the processed image signal Data1 as shown in FIG. 3. In still another embodiment, the delay correction circuit 140 may simultaneously correct the frame delays generated when the 3D image processing circuit 120 and the image playback circuit 130 process the image data signal Data and the processed image signal Data1.

In an embodiment, in addition to generating the processed viewing angle switching signal RLE1 from the viewing angle switching signal RLE provided by the external signal source EX via the delay correction circuit 140, the image display device 100" of FIG. 5 may also generate the processed viewing angle switching signal RL1 according to the processed synchronization signal Vsync1 via the viewing angle switching circuit 121 of the 3D image processing circuit 120 as shown in FIG. 1.

In an embodiment, the signal conversion circuit 160 of the image display device 100" may be coupled to the 3D image processing circuit 120 and the viewing angle input circuit 150. The signal conversion circuit 160 may be used to select and receive one of the processed viewing angle switching signal RL1 from the 3D image processing circuit 120 and the viewing angle switching signal RLE from the viewing angle input circuit 150.

Namely, the signal conversion circuit 160 may selectively provide two signal paths. As shown in FIG. 5, the signal conversion circuit 160 may provide the processed viewing angle switching signal RL1 via a first signal path (a dashed line arrow located to the right) to enable the image display system 10 to generate a 3D image. Moreover, the signal conversion circuit 160 may provide the processed synchronization signal Vsync1 to the delay correction circuit 140 via a second signal path (a dashed line arrow below), so that the delay correction circuit 140 may provide the processed viewing angle switching signal RLE1 via the second signal path (a dashed line arrow located to the right) to enable the image display system 10 to generate a 3D image.

In other words, the image display system 10 may provide the processed viewing angle switching signal RL1 and/or the processed viewing angle switching signal RLE1 to generate a 3D image through setting or user's selection.

In this way, regardless of whether the external signal source EX provides the viewing angle switching signal RLE to the image display system 10, the image display system 10 may smoothly display the 3D image. In addition, the image display system 10 of the invention may also effectively reduce the time delay between the playback image signal Data2 and the processed viewing angle switching signal RL1/RLE1 relative to the original image data signal Data and the synchronization signal Vsync, so as to achieve a good display quality effect.

Figure 7:
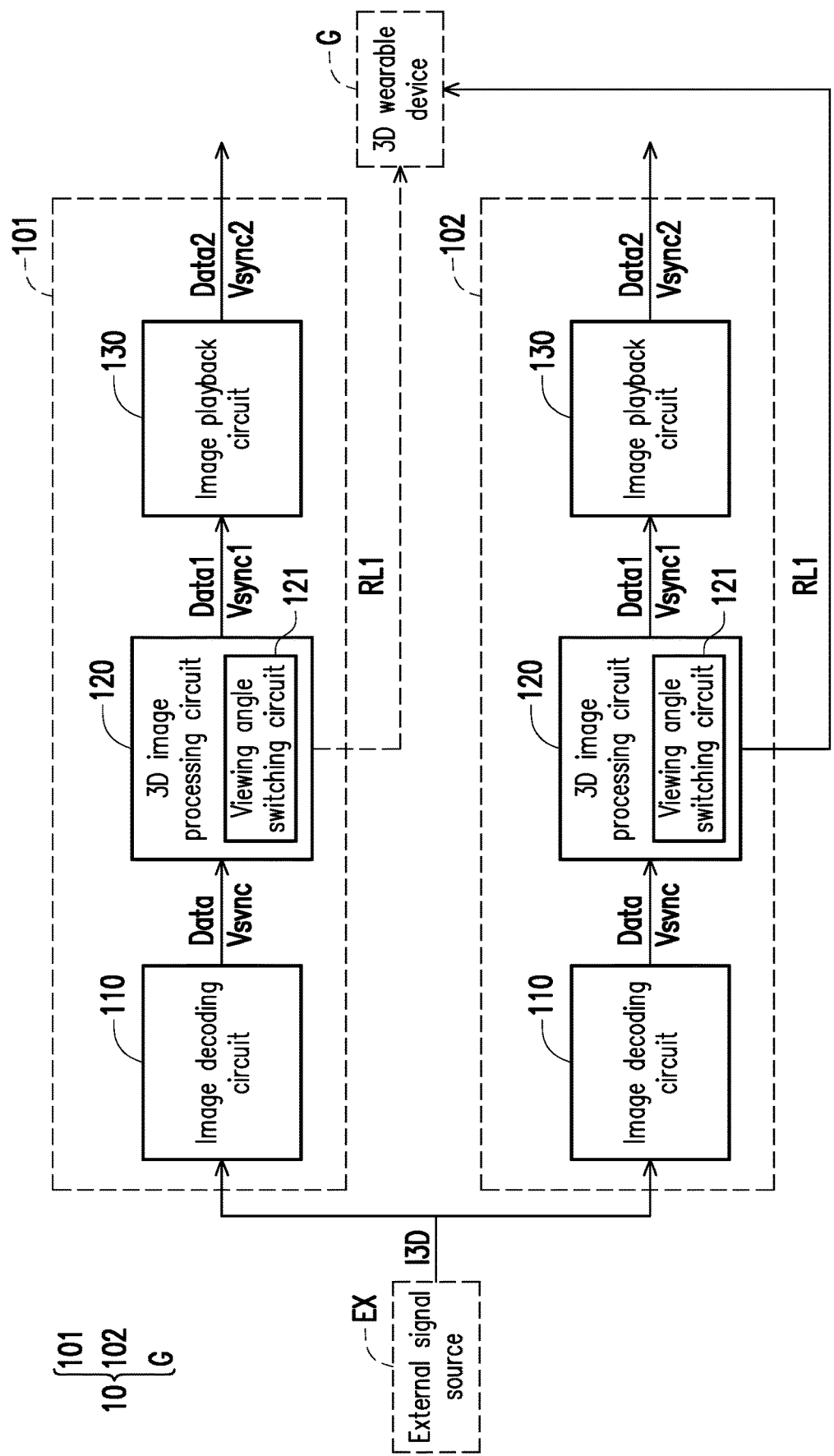
FIG. 7 is a schematic diagram of an image display system according to an embodiment of the invention.

FIG. 7 is a schematic diagram of an image display system according to an embodiment of the invention. Referring to FIG. 1 and FIG. 7, compared to FIG. 1, the image display system of FIG. 7 may include an image display device 101 (which is also referred to as a first image display device) and an image display device 102 (which is also referred to as a second image display device). Other details of the image display device 101 and the image display device 102 may be obtained by referring to related description of the image display device 100 in FIG. 1, which are not repeated.

In an embodiment, the image display device 101 and the image display device 102 respectively receive the 3D image signal I3D from the external signal source EX, and respectively output the playback image signal Data2 at a same timing. The image display device 101 and the image display device 102 may display a single 3D image or display different 3D images in a splicing manner according to the 3D image signal I3D.

In an embodiment, the 3D wearable device G of the image display system 10 may be electrically connected to one of the image display device 101 and the image display device 102. The 3D wearable device G may be used to receive the processed viewing angle switching signal RL1 from the one of the image display device 101 and the image display device 102. In addition, the 3D wearing device G is operated according to the processed viewing angle switching signal RL1 when the image display system displays a 3D image.

In an embodiment, one of the image display device 101 and the image display device 102 may provide the processed viewing angle switching signal RL1 to the 3D emitter. In an embodiment, the image display device 102 may provide the processed viewing angle switching signal RL1 to the 3D wearable device G (as shown by a solid line in the figure), but the invention is not limited thereto. In addition, the 3D wearable device G may be used to receive the processed viewing angle switching signal RL1 from the image display device 102, and is correspondingly operated to allow the left and right eyes of the user to see the 3D image.

In this way, when the image display system 10 includes the image display device 101 and the image display device 102, the 3D image displayed and combined by the image display device 101 and the image display device 102 may be smoothly displayed synchronously. Moreover, since the processed viewing angle switching signals RL1 are generated by the viewing angle switching circuits 121 of the image display device 101 and the image display device 102, the external signal source EX may simultaneously provide the 3D image signal I3D to the image display device 101 and the image display device 102 to generate the playback image signal Data2, and no other synchronization setting is required between the image display device 101 and the image display device 102. Moreover, the image display system 10 of the invention may also effectively reduce the time delay between the playback image signal Data2 and the processed viewing angle switching signal RL1 relative to the original image data signal Data and the synchronization signal Vsync, so as to achieve a good display quality effect.

Figure 8:
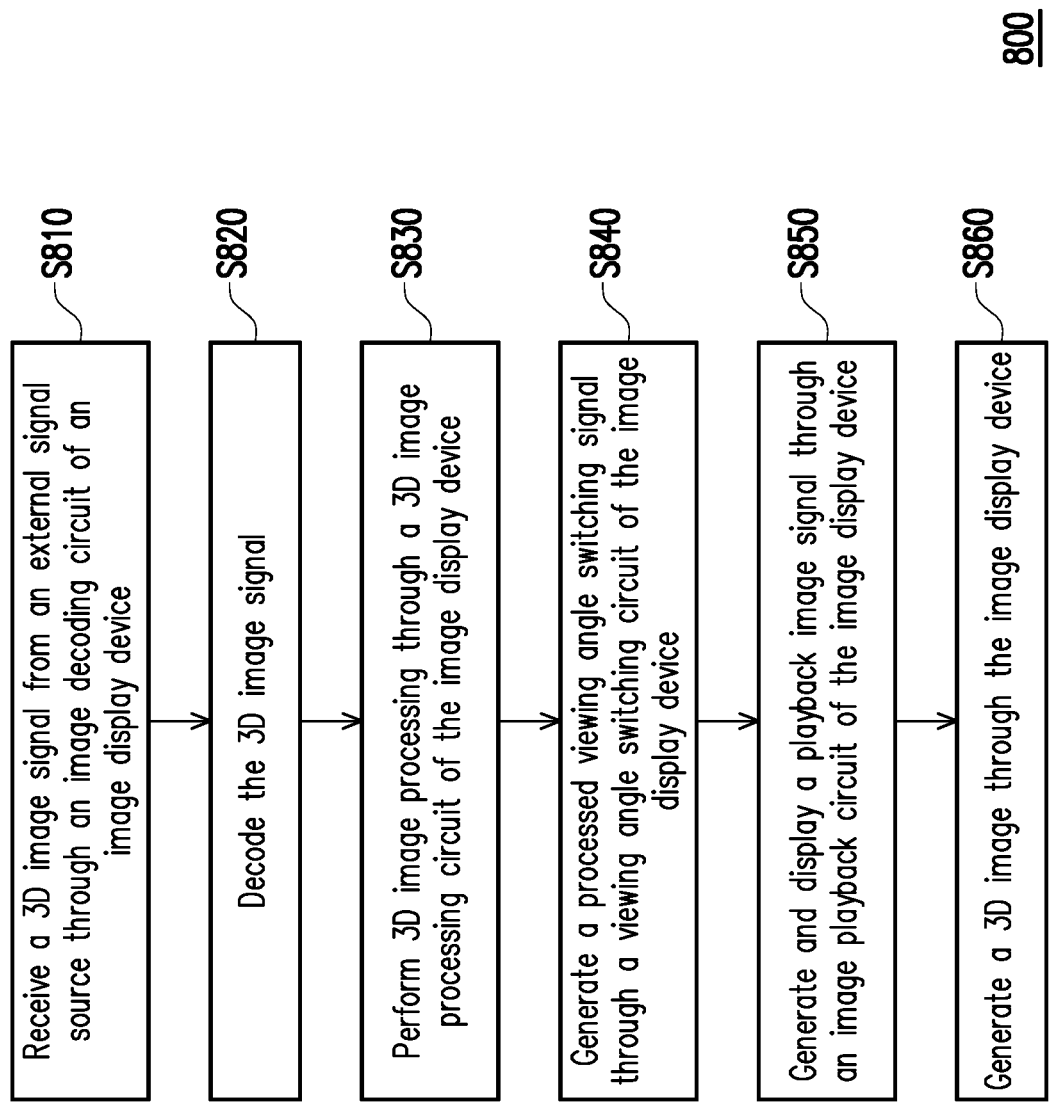
FIG. 8 is a flowchart of a display method according to an embodiment of the invention.

FIG. 8 is a flowchart of a display method according to an embodiment of the invention. Referring to FIG. 1 and FIG. 8, a display method 800 may include steps S810 to S860. The display method 800 may be performed by the image display system 10 to display a 3D image. The image display system 10 may include at least one image display device 100.

In step S810, the 3D image signal I3D coming from the external signal source EX may be received by the image decoding circuit 110 of the image display device 100.

In step S820, the 3D image signal I3D may be decoded by the image decoding circuit 110 to obtain the image data signal Data and the synchronization signal Vsync.

In step S830, 3D image processing is performed on the image data signal Data and the synchronization signal Vsync by the 3D image processing circuit 120 of the image display device 100 to generate and output the processed image data signal Data1 and the processed synchronization signal Vsync1.

In step S840, the viewing angle switching circuit 121 of the image display device 100 generates and outputs the processed viewing angle switching signal RL1 according to the processed synchronization signal Vsync1.

In step S850, the image playback circuit 130 of the image display device 100 generates and outputs the playback image signal Data2 according to the processed image data signal Data1. In other embodiments, execution of the steps S840 and S850 may be switched or the steps S840 and S850 may be executed simultaneously, and the invention does not specifically limit the sequence of the steps S840 and S850.

In step S860, the image display device 100, generates a 3D image according to the processed viewing angle switching signal RL1 and the playback image signal Data2.

In this way, even when the external signal source EX cannot provide the viewing angle switching signal corresponding to the 3D image signal I3D to the image display system 10, the image display system 10 may still display the 3D image smoothly. Moreover, the display method 800 may also effectively reduce the time delay between the playback image signal Data2 and the processed viewing angle switching signal RL1 relative to the original image data signal Data and the synchronization signal Vsync, so as to achieve the good display quality effect. In addition, enough instructions, recommendations, and implementation descriptions for implementation details of the display method 800 of the invention may be learned from the descriptions of FIG. 1 to FIG. 7, and detailed description thereof is not repeated.

In summary, with the image display system and the display method of the invention, the processed viewing angle switching signal is generated and output through the viewing angle switching circuit according to the processed synchronization signal. With the image display system, a 3D image may be generated according to the processed viewing angle switching signal and the playback image signal. Therefore, even when the external signal source cannot provide the viewing angle switching signal corresponding to the 3D image signal, the image display system and the display method may still display the 3D image smoothly. Moreover, the 3D image processing is performed by the 3D image processing circuit, and the image playback circuit only needs to convert the processed image data signal and the processed synchronization signal into the playback image signal and the playback synchronization signal. Since the image processing performed by the image playback circuit is relatively simple and uncomplicated, the delay caused by the image playback circuit to the processed image data signal may be greatly reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image display system, configured to display a 3D image, wherein the image display system comprises a first image display device, a second image display device, and a 3D wearable device, and each of the first image display device and the second image display device comprises:
    an image decoding circuit, configured to decode a 3D image signal from an external signal source, so as to obtain and output an image data signal and a synchronization signal;
    a 3D image processing circuit, receiving the image data signal and the synchronization signal from the image decoding circuit, and configured to perform 3D image processing on the image data signal and the synchronization signal, so as to generate and output a processed image data signal and a processed synchronization signal,
    wherein the 3D image processing circuit further comprises a viewing angle switching circuit configured to generate and output a processed viewing angle switching signal according to the processed synchronization signal; and
    an image playback circuit, configured to receive the processed image data signal, and generate and output a playback image signal according to the processed image data signal,
    wherein the image display system generates the 3D image according to the processed viewing angle switching signal and the playback image signal,
    wherein the first image display device and the second image display device respectively receive the 3D image signal from the external signal source, and respectively output the playback image signal at a same timing,
    wherein the 3D wearable device is electrically connected to one of the first image display device and the second image display device, and is configured to receive the processed viewing angle switching signal from the one of the first image display device and the second image display device, and the 3D wearable device is operated according to the processed viewing angle switching signal when the image display system displays the 3D image.

2. The image display system as claimed in claim 1, wherein the processed viewing angle switching signal is synchronized with the processed synchronization signal.

3. The image display system as claimed in claim 1, wherein at least one of the first image display device and the second image display device further comprises:
    a delay correction circuit, coupled to the viewing angle switching circuit, configured to adjust a phase or a level of the processed viewing angle switching signal, and output the corrected processed viewing angle switching signal, wherein the corrected processed viewing angle switching signal is synchronized with the playback image signal.

4. The image display system as claimed in claim 1, wherein at least one of the first image display device and the second image display device further comprises:
    a viewing angle input circuit, configured to receive a viewing angle switching signal from the external signal source, wherein the viewing angle switching signal corresponds to the 3D image signal; and
    a delay correction circuit, coupled to the viewing angle input circuit and an input terminal and an output terminal of the 3D image processing circuit, and configured to adjust a phase or a level of the viewing angle switching signal according to a delay time between the synchronization signal and the processed synchronization signal, so as to generate the processed viewing angle switching signal, wherein the processed viewing angle switching signal is synchronized with the processed synchronization signal.

5. The image display system as claimed in claim 4, wherein the at least one of the first image display device and the second image display device further comprises:
    a signal conversion circuit, coupled to the 3D image processing circuit and the viewing angle input circuit, and configured to select and receive one of the processed viewing angle switching signal from the 3D image processing circuit and the viewing angle switching signal from the viewing angle input circuit.

6. The image display system as claimed in claim 1, wherein the image decoding circuit and the 3D image processing circuit are implemented by a field programmable gate array.

7. A display method, adapted to display a 3D image through an image display system, wherein the image display system comprises a first image display device, a second image display device, and a 3D wearable device, and the display method comprises:
    receiving a 3D image signal from an external signal source through an image decoding circuit of the first image display device and an image decoding circuit of the second image display device;
    decoding the 3D image signal to obtain an image data signal and a synchronization signal;
    performing 3D image processing on the image data signal and the synchronization signal through a 3D image processing circuit of the first image display device and a 3D image processing circuit of the second image display device, so as to respectively generate and output a processed image data signal and a processed synchronization signal;
    generating and outputting a processed viewing angle switching signal through a viewing angle switching circuit of the first image display device and a viewing angle switching circuit of the second image display device respectively according to the processed synchronization signal;
    generating and outputting a playback image signal through an image playback circuit of the first image display device and an image playback circuit of the second image display device at a same timing according to the processed image data signal;

outputting the processed viewing angle switching signal to the 3D wearable device through one of the first image display device and the second image display device; and generating a 3D image through the image display system according to the processed viewing angle switching signal and the playback image signal, wherein the 3D wearable device is operated according to the processed viewing angle switching signal when the image display system displays the 3D image.

8. The display method as claimed in claim 7, wherein after outputting the processed viewing angle switching signal through the viewing angle switching circuit, the display method further comprises:

adjusting a phase or a level of the processed viewing angle switching signal through a delay correction circuit of the at least one image display device, wherein the corrected processed viewing angle switching signal is synchronized to the playback image signal.

9. The display method as claimed in claim 7, further comprising:

receiving a viewing angle switching signal from the external signal source through a viewing angle input circuit of the at least one image display device, wherein the viewing angle switching signal corresponds to the 3D image signal; and adjusting a phase or a level of the viewing angle switching signal through a delay correction circuit according to a delay time between the synchronization signal and the processed synchronization signal, so as to generate the processed viewing angle switching signal.

10. An image display system, configured to display a 3D image, wherein the image display system comprises a first image display device, a second image display device, and a 3D wearable device, and each of the first image display device and the second image display device comprises:

an image decoding circuit, configured to decode a 3D image signal from an external signal source, so as to obtain and output an image data signal and a synchronization signal;

a 3D image processing circuit, receiving the image data signal and the synchronization signal from the image decoding circuit, and configured to perform 3D image processing on the image at a signal and the synchronization signal, so as to generate and output a processed image data signal and a processed synchronization signal, wherein the 3D image processing circuit further comprises a viewing angle switching circuit configured to generate and output a processed viewing angle switching signal according to the processed synchronization signal; and an image playback circuit, configured to receive the processed image data signal, and generate and output a playback image signal according to the processed image data signal, wherein the image display system generates the 3D image according to the processed viewing angle switching signal and the playback image signal, wherein at least one of the first image display device and the second image display device further comprises:

a viewing angle input circuit, configured to receive a viewing angle switching signal from the external signal source, wherein the viewing angle switching signal corresponds to the 3D image signal;

a delay correction circuit, coupled to the viewing angle input circuit and an input terminal and an output terminal of the 3D image processing circuit, and configured to adjust a phase or a level of the viewing angle switching signal according to a delay time between the synchronization signal and the processed synchronization signal, so as to generate the processed viewing angle switching signal, wherein the processed viewing angle switching signal is synchronized with the processed synchronization signal; and a signal conversion circuit, coupled to the 3D image processing circuit and the viewing angle input circuit, and configured to select and receive one of the processed viewing angle switching signal from the 3D image processing circuit and the viewing angle switching signal from the viewing angle input circuit.

* * * * *